March 9, 1943.   L. E. KOEPSEL ET AL   2,313,556
POISON POWDER DISTRIBUTOR
Filed June 23, 1941   3 Sheets-Sheet 2
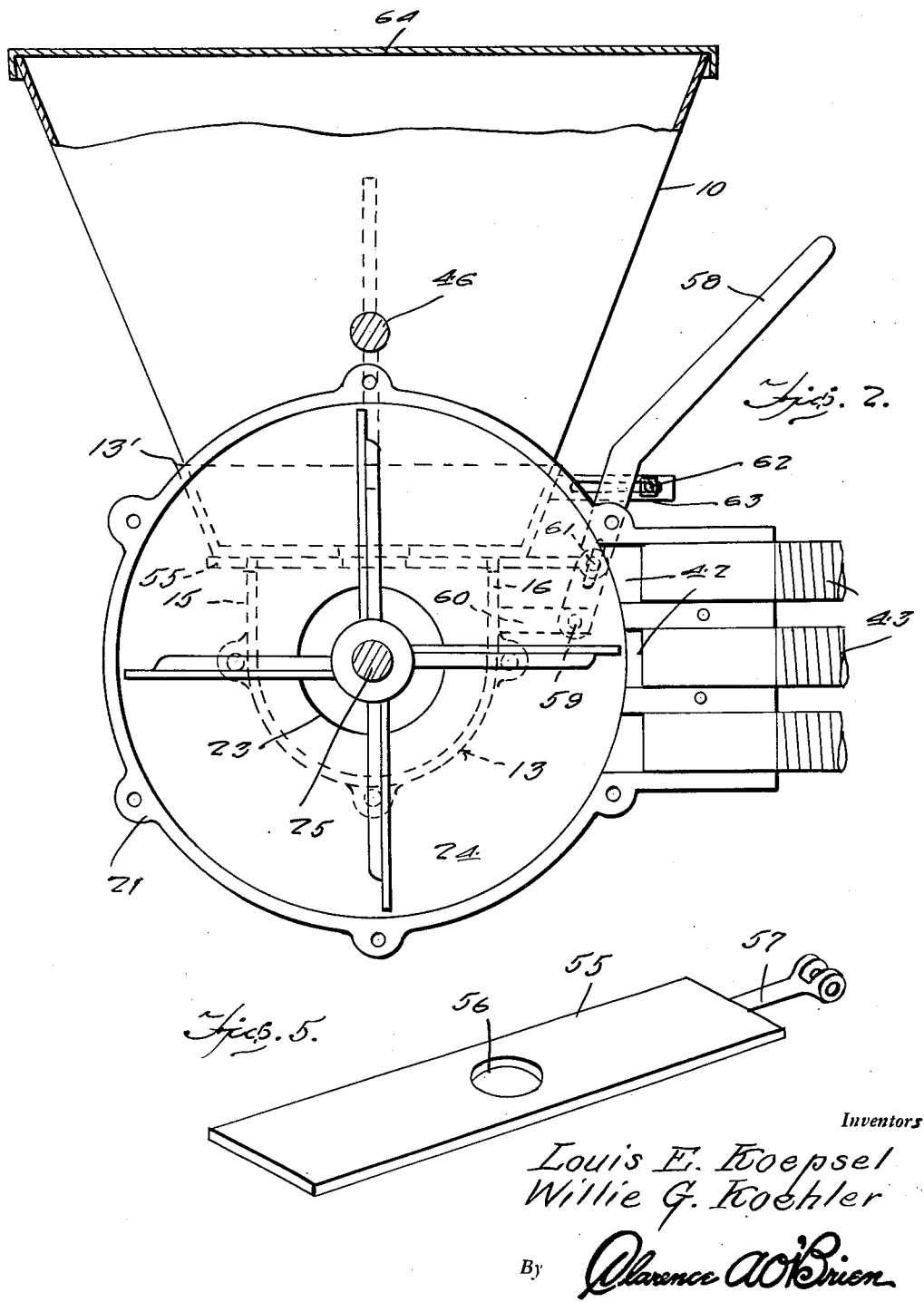
Inventors
Louis E. Koepsel
Willie G. Koehler
By Clarence A. O'Brien
Attorney

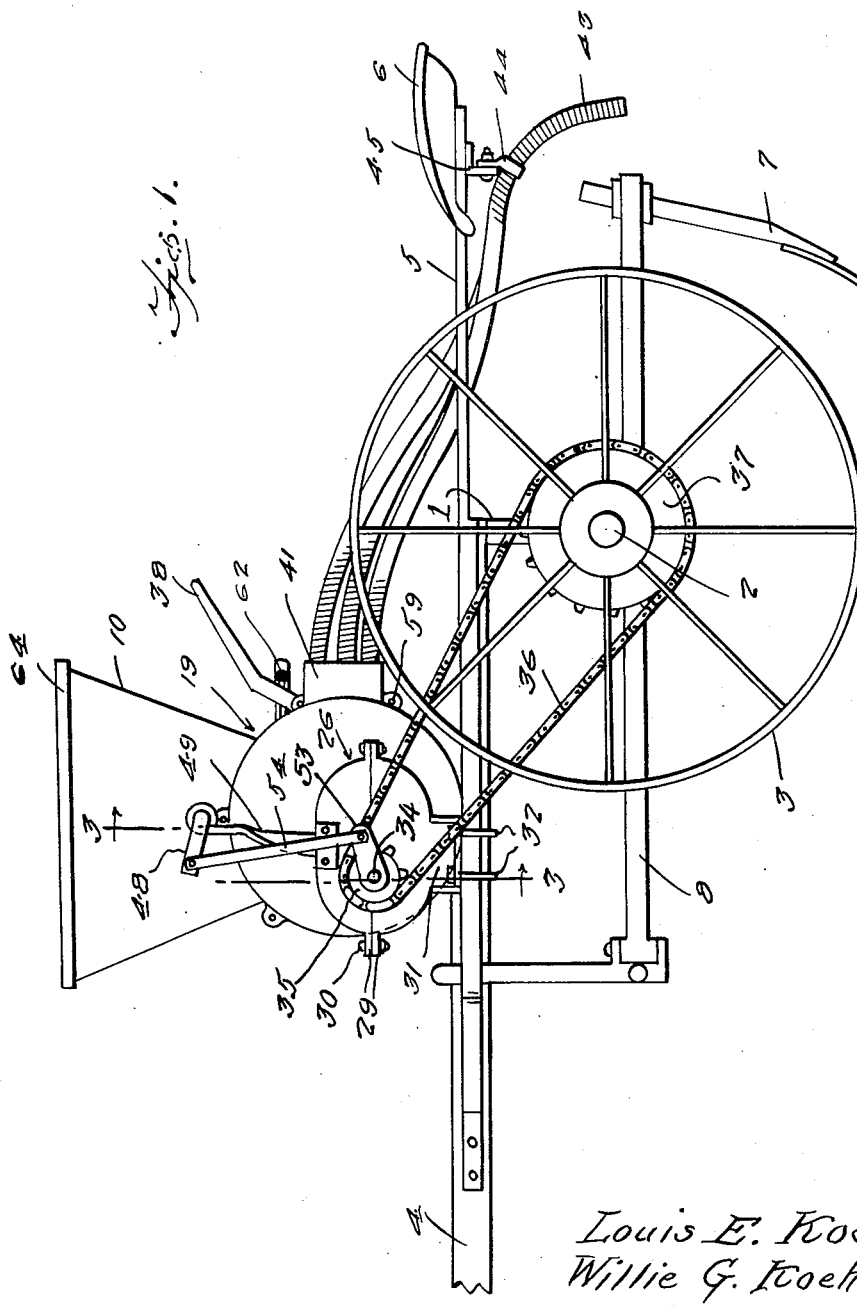

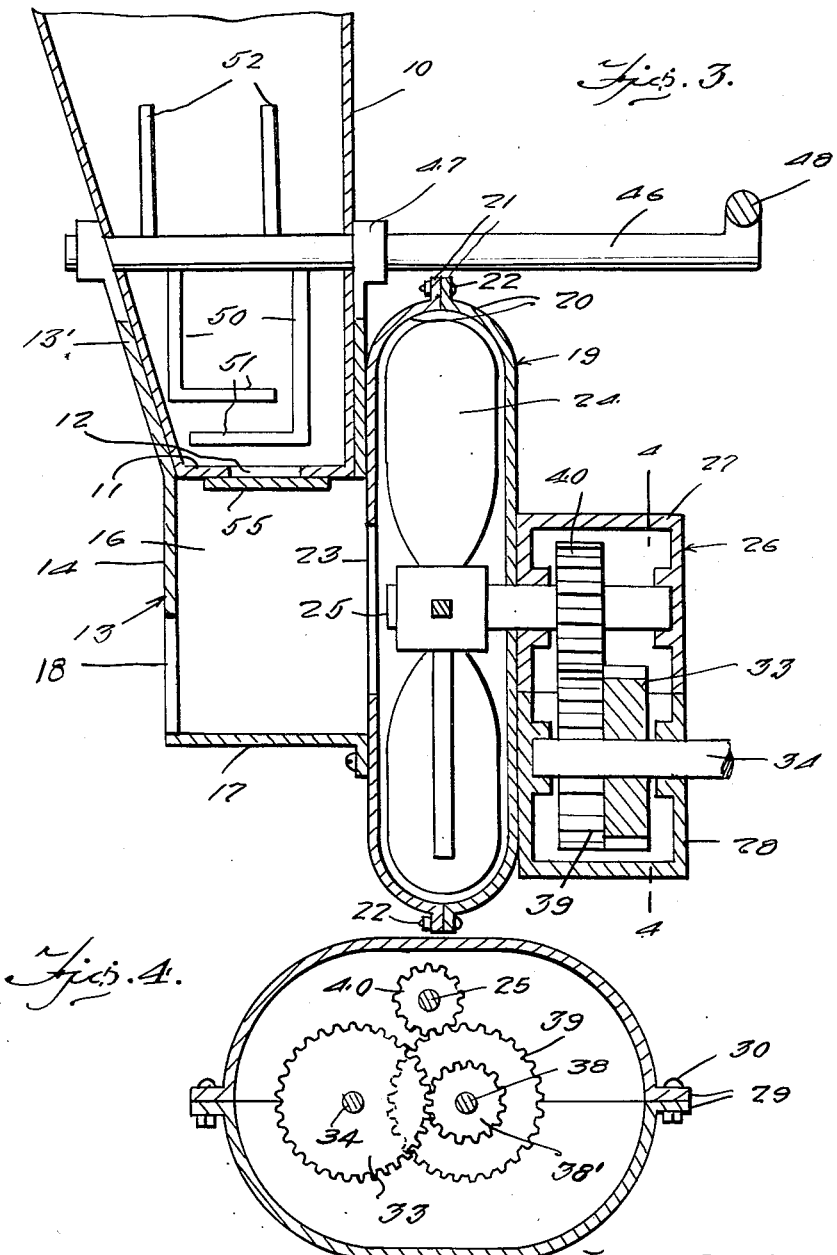

Patented Mar. 9, 1943

2,313,556

UNITED STATES PATENT OFFICE 2,313,556

POISON POWDER DISTRIBUTOR

Louis E. Koepsel and Willie G. Koehler, McQuenney, Tex.

Application June 23, 1941, Serial No. 399,350

1 Claim. (Cl. 43—148)

Our invention relates to improvements in poison powder distributors for use in destroying insects in the field, more particularly on row plants.

The principal object in view is to provide low cost, high speed equipment for easy attachment to present day cultivators to distribute poison powder under pressure rearwardly of the cultivator on rows of plants and which is simple in construction, easy to install and control, and adapted to obviate waste of the material and clogging of the same.

To the accomplishment of the above, and subordinate objects presently appearing, a preferred embodiment of our invention has been illustrated in the accompanying drawings, set forth in detail in the succeeding description, and defined in the claim appended hereto.

In said drawings:

Figure 1 is a view in side elevation illustrating the preferred embodiment of our invention, Figure 2 is a fragmentary view partly in side elevation and partly in section with parts removed to show the interior construction, and drawn to an enlarged scale, Figure 3 is a view in vertical section taken on the line 3—3 of Figure 1 and drawn to an enlarged scale, Figure 4 is a view in vertical section taken on the line 4—4 of Figure 3, and Figure 5 is a view in perspective of the supply control slide.

Referring to the drawings by numerals, our improvements have been illustrated therein, by way of exemplification, as embodied in a well known type of row cultivator, conventionally illustrated, as sufficient for the present purposes, 1 designating the frame structure, supported by an axle 2, having ground wheels thereon, as at 3, 4 the draft tongue, 5 the trailing seat support, 6 the seat, 7 one of the cultivator shovels and 8 the shovel carrying frame.

According to our invention, the powder supply hopper 10 is provided above the frame 1 in upstanding position, said hopper having a flat bottom 11 provided with a central discharge aperture 12 therein of circular form and opening into a subjacent suction box 13 depending from the bottom 11 of the hopper and preferably having an outer side wall 14, front and rear walls 15, 16 and a bottom 17 concave between the front and rear walls. The outer side wall 14 has formed therein an air intake aperture, as at 18, for a purpose presently seen. The hopper 10 may be set into an upstanding socket forming casting 13' arising from the suction box 13 and suitably secured to said hopper.

Alongside the inner side of the suction box 13 is a relatively larger, circular fan casing 19 comprising a pair of side by side dished sections 20 having edge flanges 21 bolted together, as at 22, one of said sections being opposed to the inner side of said box 13 to cover said side and having an axial intake opening 23 therein establishing communication between said box 13 and the interior of said casing 19. The casing 19 may be detachably attached to the box 13 in any desired manner.

Within the casing 19 is a suction fan 24 fast on a fan shaft 25 journaled in the outer casing section 20, axially thereof, and projecting horizontally from said casing into the top of a transmission casing 26 suitably secured to the outer face of said other section 20. The transmission casing 26 comprises a pair of upper and lower sections 27, 28 having opposed edge flanges 29 bolted together, as at 30. The lower section 28 of said casing 26 is provided with a base casting 31 suitably secured, as by U bolts 32, on top of the frame 1 of the cultivator.

Within the transmission casing 26 is a driven gear 33 fast on a driven shaft 34 extending out of said casing and equipped with a sprocket wheel 35 fast thereon. A sprocket chain 36 extends between said wheel 35 and a larger sprocket wheel 37 fast on the beforementioned ground wheel 3. The gear 33 forms part of a step-up gear train between the shaft 34 and the fan shaft 25, said gear meshing with a smaller gear 38' fast on an idler shaft 38 suitably journaled in said casing 26 and having fast thereon a larger gear 39 meshing with a relatively smaller gear 40 fast on the fan shaft 25.

Returning now to the fan casing 19, said casing is provided with a rearwardly projecting edge extension 41 forming therein a plurality, three being shown, of vertically spaced horizontally extending discharge nipples 42.

Extending rearwardly from said nipples 42 are flexible conduits 43 secured adjacent their rear ends as by fasteners 44, to a transverse angle bar, represented at 45, and attached to the seat support 5, the rear ends of the conduits pointing downwardly and rearwardly. As will be understood, the conduits 43 are spaced along said bar 45 by the fasteners 44 to discharge over rows of plants in a field.

An agitator rock shaft 46 is journaled in the hopper 10 horizontally and adjacent the bottom thereof, and also in bearings 47 provided on the castings 13', said shaft extending from the hopper over the fan casing 19 and the casing 26 and having a terminal crank 48 thereon. An auxiliary bearing bracket 49 upstanding from the casing 26 additionally supports the rock shaft 46 intermediate its ends. Within the hopper 10 the rock shaft has suitably fixed thereto a pair of depending agitator bars 50 spaced apart lengthwise of the shaft, said bars having vertically spaced right angular lower ends 51. A second pair of bars 52 arises from said shaft 46 in staggered relation to the pair of bars 50.

The driven shaft 34 is operatively connected to the rock shaft 46 by means of a crank 53 thereon and a link 54 having its ends pivotally connected to the outer ends of said cranks 53, 48, respectively.

Extending into the suction box 13 and projecting rearwardly thereof is a supply control slide 55 endwise movable forwardly and rearwardly along the bottom of the hopper 10 and having a supply control aperture 56 therein adapted to be moved into and out of registration with the discharge aperture 12. A forked arm 57 extends rearwardly from the rear end of the slide 55. At the rear of the hopper 10 is an upstanding slide shifting lever 58 having its lower end pivoted, as at 59, to an arm 60 extending from the rear of the suction box 13 and being pivotally connected, as at 61, to said forked arm 57, whereby said lever is movable forwardly and rearwardly to correspondingly shift said slide 55. Above the pivot 61 is a rearwardly extending, longitudinally slotted arm 63 having a bolt 62 therein settable along said slot to limit the rearward movement of said lever 58, the arrangement being such that in different settings of said bolt 62, rearward movement of the lever 58 is limited in different degrees to vary the relation of the aperture 56 relative to the aperture 12 and thereby selectively predetermine the maximum supply that can issue from the hopper 10 into the suction chamber 13. As will be clear, forward movement of the lever 58 moves the supply control slide 55 to close the aperture 12 completely.

Any suitable form of cover 64 may be provided for the hopper 10.

The operation of the described invention will be readily understood. The hopper 10 being filled, and the cultivator started, with the supply control slide 55 set, in the manner already described, to predetermine the maximum discharge from the hopper 10, the powder in the hopper is agitated by oscillation of the described agitator bars 50, 52, and said powder gravitates through the apertures 12, 56 into the suction box 13. During the rotation of the suction fan 24, through the power derived from the described drive connected thereto, outside air is drawn through said box 13 by way of air intake aperture 18 and into the fan casing 19 and by way of aperture 23, and at this time the powder gravitating into the box 13 is carried by this flow of air into the fan casing 19. The powder thus drawn into the fan casing 19 is blown out of the same through the conduits 43 onto the plants, or the field, as the case may be.

The foregoing will, it is believed, suffice to impart a clear understanding of our invention without further explanation.

Manifestly, the invention, as described, is susceptible of modification without departing from the inventive concept, and right is herein reserved to such modifications as fall within the scope of the subjoined claim.

What we claim is:

Apparatus for distributing poison dust and the like adapted to be mounted on a wheel supported frame and comprising a gravity feed hopper, a suction chamber below said hopper for receiving material discharged therefrom and having one side open to the outside atmosphere for admitting air thereto, a fan casing on the opposite side of said chamber communicating therewith, a combined suction and blower fan in said casing operative to draw material from said chamber into said casing and to simultaneously draw outside air through said chamber and into the casing, a plurality of discharge lines leading from said casing and for attachment to the rear of said vehicle, means to operate said fan adapted for driving by one of said wheels, a supply control slide at the bottom of the hopper for controlling discharge therefrom, operating means for said slide including a member settable to variably predetermine the maximum discharge from said hopper, vibratory agitators in said hopper, and operating connections between said operating means and agitators, said operating connections comprising a rock shaft, said agitators comprising a pair of arms depending from said shaft and having vertically spaced right angled ends, and a second pair of arms upstanding from said shaft and staggered relative to the pair first mentioned longitudinally of the shaft.

LOUIS E. KOEPSEL.
WILLIE G. KOEHLER.